(12) United States Patent
Tresino

(10) Patent No.: US 7,902,286 B2
(45) Date of Patent: Mar. 8, 2011

(54) ABRASION RESISTANT POLY(VINYL CHLORIDE) PLASTISOL

(75) Inventor: John J. Tresino, Findlay, OH (US)

(73) Assignee: PolyOne Corporation, Avon Lake, OH (US)

( * ) Notice: Subject to any disclaimer, the term of this patent is extended or adjusted under 35 U.S.C. 154(b) by 87 days.

(21) Appl. No.: 12/391,955

(22) Filed: Feb. 24, 2009

(65) Prior Publication Data

US 2009/0220797 A1 Sep. 3, 2009

Related U.S. Application Data

(60) Provisional application No. 61/032,517, filed on Feb. 29, 2008.

(51) Int. Cl.
  *C08L 83/00* (2006.01)
  *C09B 67/00* (2006.01)
(52) U.S. Cl. .......................... 524/506; 524/502
(58) Field of Classification Search .............. 524/506
  See application file for complete search history.

(56) References Cited

U.S. PATENT DOCUMENTS

| | | | |
|---|---|---|---|
| 3,654,248 A * | 4/1972 | Iida et al. ................. | 526/206 |
| 3,945,955 A | 3/1976 | Ihde et al. | |
| 3,970,620 A | 7/1976 | Ihde et al. | |
| 4,017,657 A | 4/1977 | Foley et al. | |
| 4,216,856 A | 8/1980 | Moring et al. | |
| 4,268,548 A | 5/1981 | Burba et al. | |
| 4,336,300 A | 6/1982 | Lorent et al. | |
| 4,581,413 A | 4/1986 | Kim | |
| 4,618,530 A | 10/1986 | Stetson | |
| 4,693,800 A | 9/1987 | Edwards et al. | |
| 4,886,708 A | 12/1989 | Marchal | |
| 4,900,771 A | 2/1990 | Gerace et al. | |
| 4,939,212 A | 7/1990 | Mikofalvy et al. | |
| 5,039,768 A | 8/1991 | Gerace et al. | |
| 5,290,890 A | 3/1994 | Kim et al. | |
| 5,444,110 A | 8/1995 | Kitazawa et al. | |
| 5,721,309 A * | 2/1998 | Sharma et al. ................ | 524/506 |
| 5,849,395 A | 12/1998 | Valentine et al. | |
| 6,296,588 B1 | 10/2001 | Ciemniecki et al. | |
| 6,321,483 B1 | 11/2001 | Kauss et al. | |
| 6,590,032 B2 * | 7/2003 | Furukawa et al. ............ | 525/106 |
| 6,656,979 B1 | 12/2003 | Kitano et al. | |
| 6,756,450 B2 | 6/2004 | Marinow | |
| 2002/0187341 A1 | 12/2002 | Ko et al. | |
| 2004/0234772 A1 | 11/2004 | Shortland et al. | |
| 2007/0071954 A1 | 3/2007 | Sagar | |
| 2008/0004145 A1 | 1/2008 | Duke et al. | |

\* cited by examiner

*Primary Examiner* — James Seidleck
*Assistant Examiner* — Hui Chin
(74) *Attorney, Agent, or Firm* — John H. Hornickel

(57) ABSTRACT

An abrasion resistant poly(vinyl chloride) plastisol is disclosed. The plastisol includes an effective amount of polydimethylsiloxane to increase abrasion resistance while not adversely decreasing coefficient of friction. Articles subject to friction, such as industrial power transfer belts, benefit from the abrasion resistant plastisol.

16 Claims, 2 Drawing Sheets

Comparative Example A

Example 1

Example 2

Example 3

ABRASION RESISTANT POLY(VINYL CHLORIDE) PLASTISOL

CLAIM OF PRIORITY

This application claims priority from U.S. Provisional Patent Application Ser. No. 61/032,517 filed on Feb. 29, 2008, which is incorporated by reference.

FIELD OF THE INVENTION

This invention relates to plastisols that are abrasion resistant.

BACKGROUND OF THE INVENTION

Industrial products such to continuing motion and friction need to be durable. Belts transfer power from one location to another. There needs to be sufficient friction to provide an efficient and productive transfer of power but not so much friction as to wear out the belt prematurely.

Belts are often made of vulcanized rubber or polyurethanes. Both types of belts are costly to produce because the vulcanization or polymerization processes are complicated and irreversible.

SUMMARY OF THE INVENTION

What the art needs is an abrasion resistant belt made of a less costly or complicated material.

The present invention solves that problem by using a conventional poly(vinyl chloride) plastisol ("PVC plastisol") with the addition of polydimethylsiloxane ("silicone") as the compound from which to make an industrial belt needing considerable abrasion resistance.

One aspect of the present invention is an abrasion resistant mixture, comprising (a) plastisol comprising polyvinyl chloride resin and (b) an effective amount of polydimethylsiloxane to increase abrasion resistance while not adversely decreasing coefficient of friction.

Features and advantages of the invention will be explained in respect of the various embodiments with reference to the following drawings.

EMBODIMENTS OF THE INVENTION

Plastisol

Figure 1:
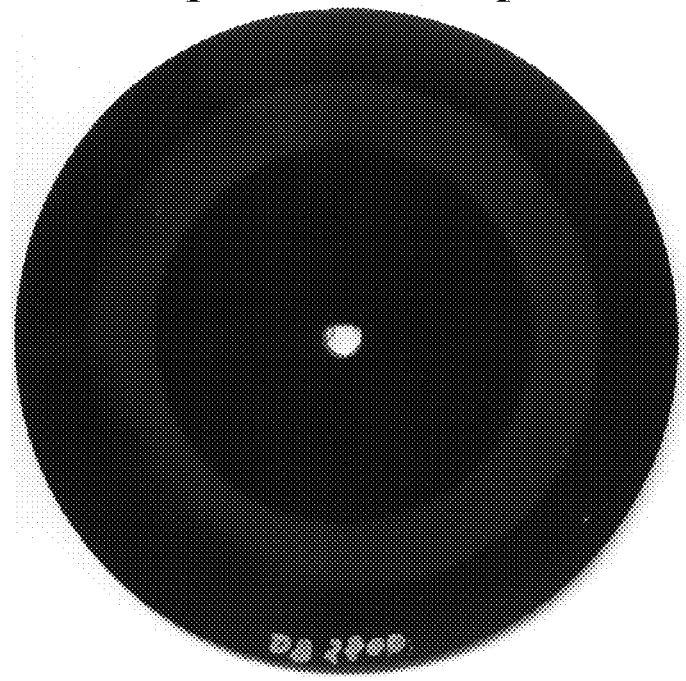
FIG. 1 is a digital image of the Taber Abrasion test of Comparative Example A.

The polymer processing art is quite familiar with vinyl plastisols. These plastisols are formed from dispersion-grade poly(vinyl chloride) (PVC) resins (homopolymers and copolymers) and plasticizers. Exemplary dispersion-grade PVC resins are disclosed in U.S. Pat. Nos. 4,581,413; 4,693,800; 4,939,212; and 5,290,890, among many others such as those referenced in the above four patents.

The primary liquid plasticizers used in preparing fluid plastisols from dispersion-grade vinyl resins are organic esters of various acids such as phthalic, phosphoric, adipic, sebacic and the like. Of these, the phthalate esters are most frequently used as principal plasticizers for dispersion type vinyl chloride resins. Dialkyl phthalates containing medium length alkyl groups (e.g. from about 6 to about 12 carbon atoms in length) provide a good balance of plastisol properties when used in proportions from about 5 to about 120 parts by weight per 100 parts of the spray dried vinyl chloride resin powder. Specific examples of useful liquid plasticizers include dioctyl phthalate, butyl benzyl phthalate, dioctyl adipate, dibutyl sebacate, dinonyl phthalate and glyceryl stearates.

PolyOne Corporation (www.polyone.com) is a commercial source of vinyl plastisols for every consumer market. These dispersions of PVC resins in plasticizing liquids are enhanced by the addition of heat or light stabilizers, color pigments, flame retardants, blowing agents and other additives required for the intended product.

Vinyl plastisols are typically liquid at room temperature and can be poured, pumped, sprayed or cast, depending on the compound. These compounds can range in hardness from fishing lure plastisol with an 8 Durometer Shore A, to roto-casting plastisol (mostly PVC) with a 65 Durometer Shore D. Advantages of vinyl plastisol in coating and molding applications include ease of use and economy.

Preferred commercially available PVC plastisols include Geon™ DB4199 Black Alloy plastisol made with Geon™ 172 dispersion grade PVC and Geon™ DB4221C BLACK LOW COF plastisol made with Geon™ 217 blending grade PVC and dispersion grade Geon 121A.

Silicone

Polydimethylsiloxane (CAS No. 63148-62-9) is the second ingredient in the compounds of the present invention. The presence of the silicone lowers the coefficient of friction of products made from PVC plastisol alone.

The amount of silicone in the compounds can range from about 8 to about 13, and preferably from about 8 to about 10 parts per hundred of the PVC resin.

Non-limiting examples of commercially available silicones include AK350 silicone from Wacker of Adrian, Michigan and SF18-350 from Momentive of Wilton, Conn.

Optional Additives

A variety of ingredients commonly used in the coatings industry can also be included in the mixture of the present invention. Non-limiting examples of such optional additives include slip agents, antiblocking agents, antioxidants, ultraviolet light stabilizers, quenchers, plasticizers, mold release agents, lubricants, antistatic agents, fire retardants, and fillers such as glass fibers, talc, chalk, or clay. Such optional additives can be included in the mixture of the present invention in an amount from none at all to about 70 phr, and preferably from about 0 to about 55 parts per hundred of PVC resin.

Any conventional colorant useful in coatings and paints is also acceptable for use in the present invention. Conventional colorants can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others. The amount of colorant can range from none at all to about 5, and preferably from about 0 to about 3 parts per hundred of the PVC resin.

Processing

Mixing of Plastisols and Silicone

Conventional mixing equipment is used to thoroughly mix the silicone into the plastisol, either in batch or continuous operations.

Mixing in a batch process typically occurs in a low shear mixer with a prop-type blade operating at a temperature below 37° C. The mixing speeds range from 60 to 1000 rpm. The output from the mixer is a liquid dispersion ready for later molding into polymeric articles.

Usefulness of the Invention

All of the advantages and usefulness of a vinyl plastisol as disclosed in the three United States Patents above are also present in the mixture of the present invention. But the silicone adds to those properties by making the mixture more abrasion resistant and more durable without sacrificing the efficiency and productivity of an industrial belt made from the compound when in use. That efficiency and productivity can be quantified as coefficient of friction.

The use of vinyl plastisol to manufacture industrial belts or other products needing abrasion resistance is not adversely affected by the presence of the silicone. Indeed, all of the conventional coating techniques for vinyl plastisols are also available for the present invention.

Dip Coating: When the plastisol coating becomes a functional part of the mold itself, the process is called dip coating. The metal insert may or may not have a requirement for an adhesive primer. Common uses include tool handles and grips; textiles; wire grates and baskets; plating racks; conveyor hooks; and the like. Dip coating can be either hot dipping or cold dipping.

Hot Dipping: By far the most common dip-coating processing technique, hot dipping requires an item to be heated first before immersion into the plastisol. The heat causes the plastisol coating to gel on the hot form.

Cold Dipping: Preheating the metal part is not required; the amount of pickup obtained depends largely on the viscosity and thixotropic ration of the plastisol.

Molding: Several types of molding are common to plastisol applications. Slush Molding is used to produce hollow, flexible items by filling a mold with plastisol, heating sufficiently to gel a layer next to the inner mold surface, and then draining the excess plastisol. The gelled layer is then completely fused and stripped from the mold. Rotational Molding involves hollow flexible or rigid forms with complex shapes. The process is done using a two-part mold filled with a predetermined weight of plastisol, inserted into a heated oven and rotated on two planes simultaneously. Dip Molding refers to the process of dipping a solid mold; gelling, fusing and stripping the hollow part. Open Molding is a process of molding directly in, or into, a finished article such as automotive air filters.

Other Coating: Several types of coating employ movement of the plastisol relative to the item or the item relative to the plastisol. One skilled in the art readily can employ knife coating, roll coating, reverse roll coating, etc. according to techniques taught in encyclopedias, other technical literature, or the patent literature, without undue experimentation. One reason for such easy adaptation of the mixtures of the present invention to conventional plastisol coating is that the presence of silicone does not adversely affect viscosity of the mixture.

Vinyl plastisols can be certified for end-use automotive, FDA, UL, ASTM, NSF, USDA, military, medical or customer-specific applications.

Any article that needs abrasion resistant properties suitable for preparation from a vinyl plastisol can be prepared from the present invention. Non-limiting examples of abrasion resistant plastisol-made articles include industrial power transfer belting, flooring, protective curtains, and any other article that is used where excellent abrasion resistance is needed or low co-efficient of friction where frictional motion needs to be managed.

Conveyor belts and other useful articles can be made from plastisols of the present invention according to techniques known to those skilled in the art. For example, U.S. Pat. No. 4,216,856 (Moring et al.) teaches the manufacture of conveyor belts from polyvinyl chloride plastisols. U.S. Pat. No. 4,618,530 (Stetson) teaches the manufacture of composite mats for flooring purposes. U.S. Pat. No. 5,849,395 (Valentine et al.) teaches the manufacture of industrial fabric from a plastisol, which can be used papermachine clothing, belting, or filter cloth.

Further embodiments are described in the following examples.

EXAMPLES

Table 1 shows the source of the ingredients and the amounts used to prepare Comparative Example and Examples 1-3.

TABLE 1

Recipes (in parts)

| Ingredient Name | Comp. Ex. A | Ex. 1 | Ex. 2 | Ex. 3 |
|---|---|---|---|---|
| PVC Resin | | | | |
| Geon 172 PVC resin (PolyOne, Avon Lake, OH) | | 100 | 0 | 0 |
| Geon 121A PVC resin (PolyOne) | | 0 | 60 | 60 |
| Geon 124A Resin (PolyOne) | 100 | | | |
| Geon 217 PVC resin (PolyOne) | | 0 | 40 | 40 |
| Other Ingredients | | | | |
| Jayflex DIDP Plasticizer (ExxonMobil, Baytown TX) | | 50 | 35 | 27 |
| Palatinol DPHP (BASF, Pasadena TX) | 60 | | | |
| Plaschek 775 epoxidized soybean oil processing aid (Ferro, Walton Hills, OH) | | 0 | 0 | 5 |
| Interstab L-CZL-720A calcium zinc stabilizer (Akcros, New Brunswick, NJ) | | 0 | 3 | 3 |
| Plastistab 2936 phosphite processing aid (Halstab, Hammond, IN) | | 0 | 0 | 1 |
| AK350 silicone (Wacker, Adrian, MI) | | 8 | 6 | 10 |
| Stan-Tone HCC 29374 carbon black pigment dispersion (PolyOne) | 2 | 2 | 2 | 2 |
| Eastman TXIB plasticizer (Eastman, Kingsport, TN) | | 5 | 5 | 5 |
| Exxon OMS odorless mineral spirits diluent (ExxonMobil) | | 0 | 2 | 2 |
| Plastistab 2380 (Hallstab Hammond Indiana) | 0.5 | 3 | 0 | 0 |
| Polycal 325 Moisture Scavenger (Mississippi Lime Company Genevieve, MO) | 0.5 | | | |

Table 2 shows the method of preparation and the ultimate properties. After the PVC plastisol was made, the compounds were tested using the requirements of ASTM D3389-05 for Taber Abrasion and ASTM D1894-06 for Coefficient of Friction.

TABLE 2

Preparation and Properties

| Ingredient Name | Comp. Ex. A | Ex. 1 | Ex. 2 | Ex. 3 |
|---|---|---|---|---|
| Mixing Equipment | | Prop Type Blade | | |
| Mixing Temp. | | Kept Below 37° C. | | |
| Mixing Speed | | Medium | | |
| Order of Addition | | Order listed in Table 1 | | |
| Form of Product | | Liquid Dispersion | | |
| Properties | | | | |
| Abrasion Resistance (ASTM D3389-05) using a CS-17 Wheel, 500 g Force, and 500 Revolutions | 0.0020 | 0.0036 | 0.0036 | 0.0054 |
| Kinetic Coefficient of Friction (ASTM D1894-06) using Steel as opposing surface | 0.487 | 0.138 | 0.155 | 0.244 |
| Static Coefficient of Friction (ASTM D1894-06) using Steel as opposing surface | 0.808 | 0.225 | 0.337 | 0.728 |

Example 3 had better coefficient of friction than Examples 1 and 2, using Comparison Example A as a control. But Examples 1 and 2 were nonetheless also acceptable, although Example 3 was better performing in reducing the loss of coefficient of friction (COF).

In some applications, such as a belt with a significant incline, one may wish to improve abrasion resistance without significantly altering the COF. However, in many other applications, it is very useful to reduce the COF in addition to increasing the abrasion resistance. Reducing the COF of the belt greatly reduces the frictional losses between the belt and the drive and support components. This greatly reduces the size of the required drive motors and the energy consumption in the operation of the belt.

Therefore, this invention contributes to cost reductions, a lower carbon footprint, and is more sustainable. Of course, if one reduces the COF too much, the belt may slip against the drive mechanism which is very inefficient and undesirable. Therefore, Examples 1-3 illustrate to one skilled in the art how this invention increases the abrasion resistance and therefore the life of the belt while allowing that person to tailor the COF to the given application to maximize efficiency while avoiding undesirable side effects such as slippage.

Figure 2:
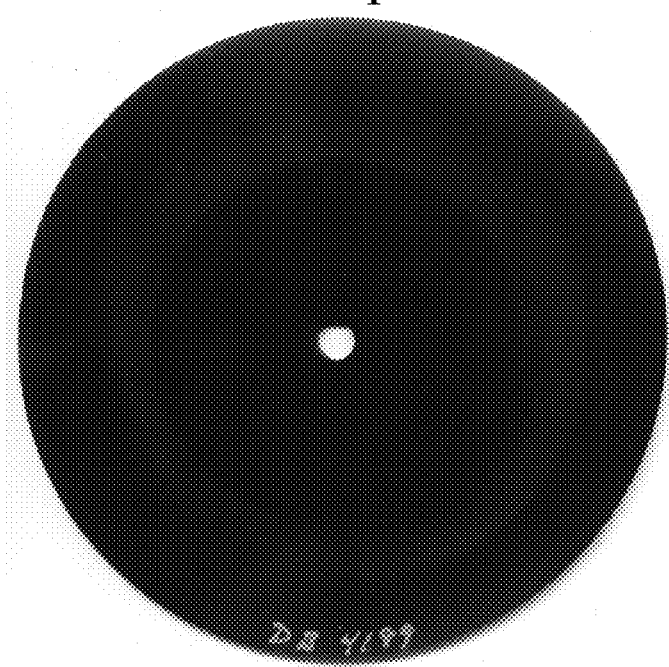
FIG. 2 is a digital image of the Taber Abrasion test of Example 1.
Figure 3:
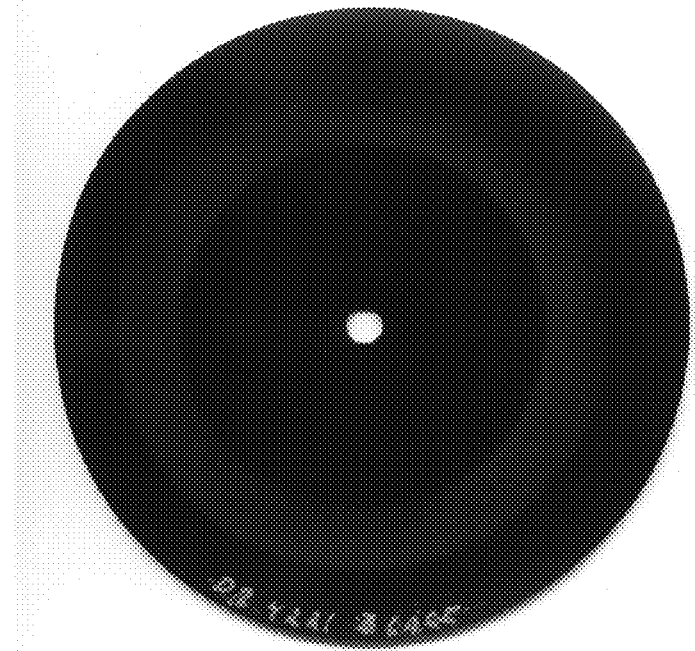
FIG. 3 is a digital image of the Taber Abrasion test of Example 2.
Figure 4:
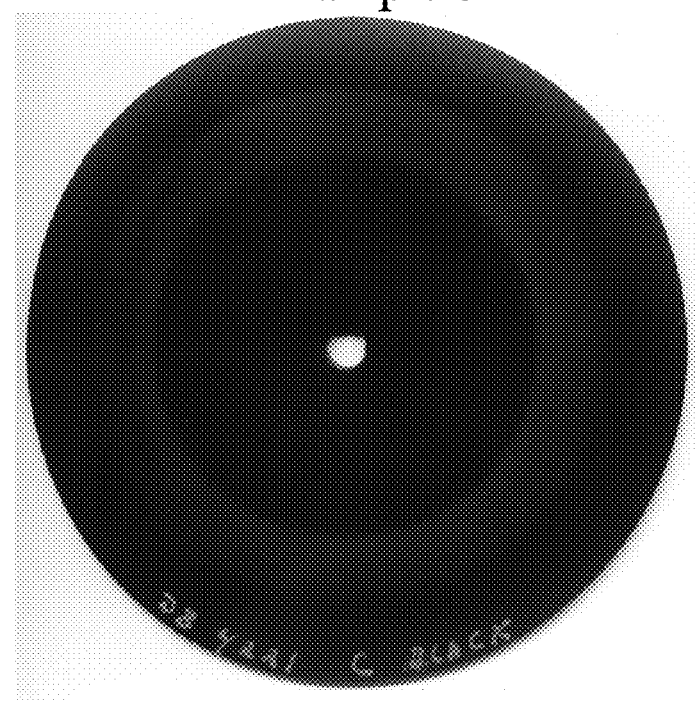
FIG. 4 is a digital image of the Taber Abrasion test of Example 3.

Taber Abrasion results seemed contradictory and anomalous to the COF results. But in fact, the quantitative results were anomalous to the visual results. Visual evidence of the four examples (FIGS. 1-4) show that the actual amount of surface damage of Examples 1-3 was significantly less than that of Comparative Example A. While not being limited to a particular theory, it was believed that the Taber wheel picked up high density silicone from the surface of Examples 1-3, leading to higher mass loss as compared to Comparative Example A, with little actual damage to the surface.

Therefore, the visual evidence supports the unexpected properties of plastisols of the present invention: increase of abrasion resistance with a variety of coefficients of friction, within acceptable limits.

The invention is not limited to these embodiments. The claims follow.

What is claimed is:

1. An abrasion resistant mixture, comprising:
   (a) liquid plastisol comprising plasticizer and polyvinyl chloride resin dispersed in the plasticizer and
   (b) an effective amount of polydimethylsiloxane to increase abrasion resistance while not adversely decreasing coefficient of friction,
   wherein the mixture is a liquid, and
   wherein the effective amount ranges from about 8 to about 13 parts per 100 parts of the polyvinyl chloride resin.

2. The mixture of claim 1, wherein the effective amount ranges from about 8 to about 10 parts per 100 parts of the polyvinyl chloride resin.

3. The mixture of claim 1, further comprising an optional additive selected from the group consisting of slip agents, antiblocking agents, antioxidants, ultraviolet light stabilizers, quenchers, plasticizers, colorants, mold release agents, lubricants, antistatic agents, fire retardants, and fillers such as glass fibers, talc, chalk, or clay.

4. The mixture of claim 3, wherein the optional additive is present in an amount from none at all to about 70 parts per 100 parts of the polyvinyl chloride resin.

5. The mixture of claim 3, wherein the optional additive is present in an amount from 0 to about 55 parts per 100 parts of the polyvinyl chloride resin.

6. A coating of the mixture of claim 1.

7. The coating of claim 6, wherein the effective amount ranges from about 8 to about 10 parts per 100 parts of the polyvinyl chloride resin.

8. The coating of claim 6, wherein the mixture further comprises an optional additive selected from the group consisting of slip agents, antiblocking agents, antioxidants, ultraviolet light stabilizers, quenchers, plasticizers, colorants, mold release agents, lubricants, antistatic agents, fire retardants, and fillers such as glass fibers, talc, chalk, or clay.

9. The coating of claim 8, wherein the optional additive is present in an amount from none at all to about 70 parts per 100 parts of the polyvinyl chloride resin.

10. The coating of claim 8, wherein the optional additive is present in an amount from 0 to about 55 parts per 100 parts of the polyvinyl chloride resin.

11. The mixture of claim 1, wherein the mixture is in the form of a molded article.

12. The mixture of claim 11, further comprising an optional additive selected from the group consisting of slip agents, antiblocking agents, antioxidants, ultraviolet light stabilizers, quenchers, plasticizers, colorants, mold release agents, lubricants, antistatic agents, fire retardants, and fillers such as glass fibers, talc, chalk, or clay.

13. The mixture of claim 1, wherein the mixture is in the form of a coating on an article.

14. The mixture of claim 13, further comprising an optional additive selected from the group consisting of slip agents, antiblocking agents, antioxidants, ultraviolet light stabilizers, quenchers, plasticizers, colorants, mold release agents, lubricants, antistatic agents, fire retardants, and fillers such as glass fibers, talc, chalk, or clay.

15. A method of using a mixture of claim 1, comprising the step of applying the mixture to an article.

16. The method of claim 15, wherein the mixture further comprises an optional additive selected from the group consisting of slip agents, antiblocking agents, antioxidants, ultraviolet light stabilizers, quenchers, plasticizers, colorants, mold release agents, lubricants, antistatic agents, fire retardants, and fillers such as glass fibers, talc, chalk, or clay.

* * * * *